United States Patent Office
2,760,545
Patented Aug. 28, 1956

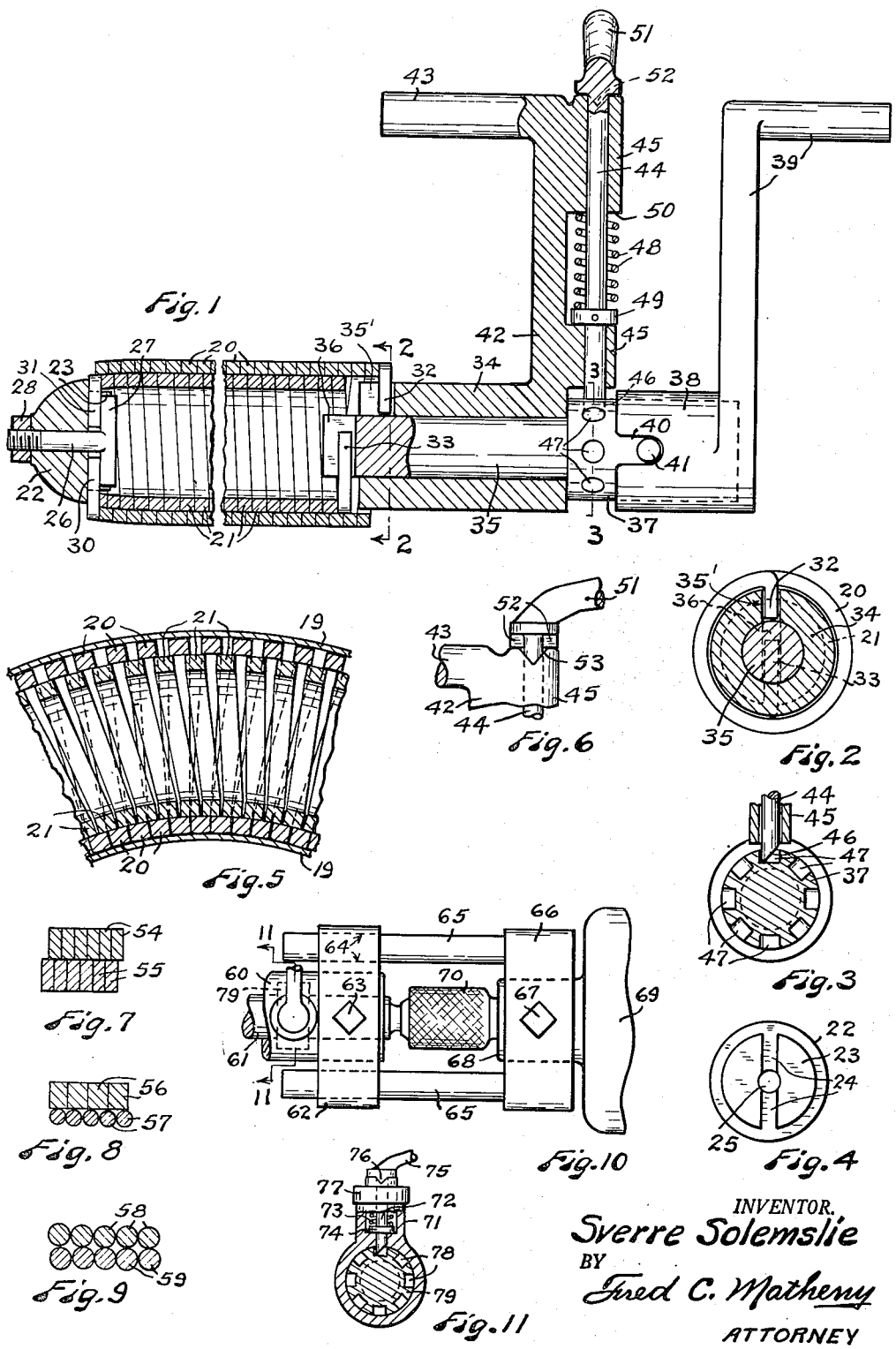

2,760,545

PIPE BENDING TOOL

Sverre Solemslie, Seattle, Wash.

Application June 23, 1952, Serial No. 294,991

4 Claims. (Cl. 153—63)

This invention relates to a pipe bending tool of a type adapted to be inserted in and remain within a pipe or tube during the operation of bending said pipe or tube.

An object of this invention is to provide a pipe bending tool for use in a pipe while the same is being bent to prevent flattening, wrinkling or other deformation of the pipe and to insure smooth and accurate bending of the pipe without reduction of the cross sectional area of said pipe at the location of the bend.

Another object of this invention is to provide a pipe bending tool of simple and efficient construction which may quickly and easily be inserted in a pipe to be bent and which will support the walls of the pipe while it is being bent in any direction and will efficiently prevent flattening and kinking or wrinkling of the pipe and which can be quickly and easily removed from a pipe after it has been bent.

Another object is to provide a pipe bending tool which can be made in any desired length and which is flexible in all directions and which is easy to insert in a pipe and can be expanded firmly against the inside wall of a pipe to adequately support the pipe during the bending of the same and which can be contracted or reduced in diameter so that it may readily be withdrawn from a pipe after the pipe has been bent.

Another object of this invention is to provide a tool for use in a pipe or tube to prevent collapsing and flattening and wrinkling of the tube while the same is being bent comprising an outer spring metal coil closely helically wound in one direction and an inner spring metal coil closely helically wound in the opposite direction and telescopically fitting snugly within the outer coil, the two coils being rigidly connected with each other at one end and having means for applying torque to the coils at the other end to thereby selectively expand or contract both of the coils.

Other objects of the invention will be apparent from the following description taken in connection with the accompanying drawings.

In the drawings:

Figure 1 is a view partly in section and partly in side elevation and with parts broken away showing a pipe bending tool constructed in accordance with this invention, said tool having hand operated means for imparting torque to the two coils thereof.

Fig. 2 is a sectional view, with parts in elevation, taken substantially on broken line 2—2 of Fig. 1.

Fig. 3 is a sectional view, with parts in elevation taken substantially on broken line 3—3 of Fig. 1.

Fig. 4 is a detached end view of a fitting used for attaching together two outer end portions of two helical coils.

Fig. 5 is a fragmentary sectional view showing this tool as it may appear when in use in a pipe which is being bent.

Fig. 6 is a fragmentary detached view in elevation showing part of a releasable reversible ratchet means.

Fig. 7 is a fragmentary sectional view illustrating two coils formed of spring wire of rectangular cross section which may be used in the tool in place of the coils shown in Figs. 1 and 5.

Fig. 8 is a fragmentary sectional view illustrating an outer coil formed of spring wire of rectangular cross section and an inner coil formed of spring wire of round cross section and which may be used in this tool.

Fig. 9 is a fragmentary sectional view illustrating two coils formed of spring wire of round cross section and which may be used in this tool.

Fig. 10 is a fragmentary top plan view showing means for applying a power operated reversible motor to this tool to exert a torque on the coils of the same.

Fig. 11 is a fragmentary view partly in elevation and partly in section, taken substantially on broken line 11—11 of Fig. 10 and showing releasable reversible ratchet means similar to that shown in Figs. 1, 3 and 6.

Like reference numerals designate like parts throughout the several views:

The pipe bending tool shown by way of illustration in Figs. 1 to 6 inclusive comprises an outer closed coil 20 of spring metal of rectangular or substantially square cross section wound helically in one direction and an inner closed coil 21 of similar spring metal wound helically in the opposite direction. The coils 20 and 21 are, in effect, two relatively telescoped coil springs of different diameters coiled helically in opposite directions. The outer coil 20 is a pipe engaging coil and is adapted to fit snugly within a pipe 19 which is to be bent. The inner coil 21 is a reinforcing coil which fits snugly within the outer coil 20 and reinforces the outer coil against crushing pressures.

The ends of the two coils 20 and 21 shown at the left in Fig. 1 are herein referred to as the outer ends and are securely fastened together by clamp means including a fitting 22. The fitting 22 has a hub 23, Fig. 4, of reduced diameter which extends into the end of the inner coil 21 and is provided with a cross slot 24. Also the fitting 22 has an axial bore 25 within which is disposed a bolt 26 which has a head 27 in the form of a rigid cross bar on its inner end. The cross bar 27 fits within the cross slot 24 and a nut 28 is provided on the outer end of the bolt 26. The outer end portions of the two coils 20 and 21 adjacent the fitting 22 are respectively provided with inwardly bent radially disposed terminal end members 30 and 31 which are positioned in the cross slot 24 of the fitting 22 under the cross bar 27 and are securely clamped to said fitting by the bolt 26. The fitting 22 and parts connected therewith thus serve as clamp means to securely clamp together the outer end portions of the two coils 20 and 21.

Preferably the coils 20 and 21 are wound so that the outer ends thereof are slightly convergently tapered at the location where they connect with the fitting 22. It has been found that the tool comes out of a pipe more easily after the pipe has been bent if this slight taper is provided on the outer end portions of the two coils 20 and 21.

The inner end portions of the two coils 20 and 21, shown at the right in Fig. 1, terminate in radially disposed terminal members 32 and 33 respecitvely, see Figs. 1 and 2. The terminal end member 32 of the outer coil 20 is secured to a sleeve 34 as by engaging it within a slot 35' in said sleeve. The terminal member 32 of the inner coil 21 is secured to a shaft 35, as by engaging it within a cross slot 36 in the end of said shaft.

The shaft 35 is journaled in the sleeve 34 and has a portion 37 of enlarged diameter rigid with the end thereof remote from the coils 20 and 21. A tubular hub 38 of a crank 39 is adapted to fit over the enlarged portion 37 of the shaft 35 and is provided with a notch 40 which receives a rigid radial pin in the shaft part 37.

This provides means by which the shaft 35, 37 may be turned relative to the sleeve 34.

The sleeve 34 has a rigidly connected radially extending crank arm 42 which terminates in a handle 43 and by which the sleeve may be manually turned or may be held while the shaft 35 is being turned.

Reversible and releasable ratchet means is provided between the sleeve 34 and the shaft 35 to releasably lock said sleeve and shaft against relative rotary movement in either desired direction or to leave said sleeve and shaft free to move rotatively relative to each other. This ratchet means comprises a radially movable stem or pawl 44 guided in bracket members 45 on the handle 42 and having a wedge shaped inner end portion 46, Fig. 3, adapted to engage within radial depressions or recesses 47 in the enlarged part 37 of the shaft 35. A compression spring 48 on the stem 44 reacts between a shoulder 50 of one of the bracket members 45 and a collar 49 on the stem 44 and yieldingly urges the stem 44 toward the shaft 35, 37. A transversely extending handle 51 is rigid with the upper end of the stem 44 and serves as a means for rotatively moving said stem in the brackets or bearings 45. V-shaped cam means 52 is provided at the junction of the stem 44 and handle 51 for cooperation with a similarly shaped notch 53 in the upper bracket member 45 to raise the stem 44 in response to rotation of the same. Turning the handle 51 one hundred eighty degrees will reverse the position of the wedge shaped end portion 46 of the stem 44 and thus reverse the ratchet action of the device. Turning the handle 51 far enough or into a suitable position to lift the cam 52 out of the groove or notch 53 will completely disengage the ratchet from the shaft part 37 and this will relieve the two springs 20 and 21 of torque and allow them to seek a released position.

The two coils 20 and 21 are wound in opposite directions, one right and one left, and the convolutions of these coils cross each other in such a manner as to provide a highly efficient supporting and reinforcing of the outer coil by the inner coil. Also winding these two coils in two opposite directions and attaching together the two outer ends of said coils makes it possible to counterbalance one coil against the other for the purpose of applying torque to the coils and simultaneously expanding or contracting both of said coils. The inner coil 21 thus serves as a bendable torque transmitting means positioned longitudinally within the outer coil and attached to one end of the outer coil and adjustably connected with the other end of the outer coil by torque applying means in the form of the shaft 35 and sleeve 34. Preferably the coils 20 and 21 are both closely wound.

In manufacture, the two coils 20 and 21 of each tool are preferably sized so that when they are in a released condition the tool can readily be inserted into a pipe of a predetermined internal diameter and will fit closely in the pipe. After the tool has been inserted into the pipe the ratchet means is set so that a torque tending to unwind the two coils can be applied by relatively moving the two levers 39 and 42. When an unwinding torque is thus applied to the two coils the outer coil 20 is expanded firmly against the inner wall of the pipe and the inner coil is expanded firmly against the outer coil and reinforces the same. The pipe can then be bent in any desired direction and to substantially any curvature ordinarily required without danger of flattening the pipe or wrinkling or kinking said pipe on the concave side of the bend or reducing the cross sectional area of the pipe. After the pipe has been bent the ratchet means is moved to released position and the two coils will return to their normal released condition in which they will be loose in the pipe. In some instances, depending on the length of pipe and acuteness of bending, this may make it possible to readily withdraw the tool from the bent pipe. If the tool does not withdraw easily in the fully released condition then the ratchet means may be reversed and torque tending to wind up the coils may be applied. This will reduce the diameter of the two coils so that the tool can be easily withdrawn irrespective of the type of bend which has been made in the pipe.

The cross sectional form of the spring wire or material used in making the coils may be varied. Fig. 7 shows a fragment of an outer coil 54 and an inner coil 55 which may be used in place of the coils 20 and 21. Both of the coils 54 and 55 are formed of spring material of rectangular cross section with this material wound so that its major cross sectional dimension is radial and its minor cross sectional dimension is longitudinal relative to the coils. This provides coils which offer high resistance to external pressures tending to flatten them. Also this provides coils of many convolutions per unit of length and coils in which the width of the individual spaces between adjacent convolutions on the convex side of a bend are narrow.

Fig. 8 shows a fragment of an outer coil 56 formed of spring wire of rectangular cross section and an inner coil 57 formed of wire of round cross section and which can be used in the construction of this tool.

Fig. 9 shows a fragment of an outer coil 58 and an inner coil 59 both formed of spring wire of round cross section. The material of round cross section is not regarded as desirable, especially for the outer coil, as is material of rectangular cross section.

In tools of larger sizes it may be desirable to provide power actuated means, instead of the manual means as shown in Figs. 1 to 6, for applying torque to the two coils. One such power actuated means is illustrated in Figs. 10 and 11. This means includes a sleeve 60 and a shaft 61, both of modified form but which are connected with the two coils of the tool in the same manner as the sleeve 34 and shaft 35 shown in Fig. 1. A collar 62 is rigidly secured to the sleeve 60 as by a cap screw 63 and is provided with perforations 64 to slidably receive two bars 65. The bars 65 are rigid with another collar 66 which is secured, as by a cap screw 67, to a hub 68 of a reversible motor 69. This provides a torque resisting means connecting the sleeve 60 with the housing of the motor 69. A driven chuck 70 of the reversible motor 69 is connected with the shaft 61. Obviously rotation of the chuck 70 will rotate the shaft 61 in sleeve 60 and this will twist or untwist coils which are connected with the shaft 61 and sleeve 60 respectively. The motor is quickly attachable and detachable and the collar 66 with rods 65 may be quickly and easily attached to or detached from the motor 69.

Reversible releasable ratchet means of any suitable type is provided between the sleeve 60 and shaft 61. One such means similar in construction and operation to the ratchet means shown in Fig. 1 and hereinbefore described is herein illustrated. This means comprises a tubular housing or boss 71 on the sleeve 60 and a stem 72, spring 73 and collar 74 in said housing 71. A lever 75 rigid with the upper end of stem 72 has a cam 76 cooperating with a suitable V-shaped notch in a fitting 77 on the top end of housing 71. Rotary movement of stem 72 will disengage the wedge shaped bottom end of said stem from recesses 78 in an enlarged portion 79 of shaft 61. The ratchet means shown in Figs. 10 and 11 operates in substantially the same manner as the hereinbefore described ratchet means shown in Figs. 1 and 3.

The foregoing description and accompanying drawings clearly disclose preferred embodiments of this invention but it will be understood that this disclosure is merely illustrative and that changes in the tool may be made within the scope and spirit of the following claims.

I claim:

1. A pipe bending tool for insertion into a pipe which is to be bent comprising a pipe engaging outer spring metal coil closely wound helically in one direction; a reinforcing inner spring metal coil closely wound helically in the opposite direction and fitted snugly within said outer coil; means fixedly connecting said two coils together at one end; and torque applying means operatively connected with the other end portions of said two coils capable of exerting oppositely directed forces on the ends of said coils.

2. A pipe bending tool for insertion into a pipe which is to be bent comprising a pipe engaging outer spring metal coil closely wound helically in one direction; a reinforcing inner spring metal coil closely wound helically in the opposite direction and fitting snugly within said outer coil; means fixedly connecting said two coils together at one end; two relatively rotatable members attached to the other end portions of said coils; and torque applying means connected with said relatively rotatable members, whereby oppositely directed torque may be applied to said other end portions of said coils.

3. A pipe bending tool for insertion into a pipe which is to be bent comprising a pipe engaging outer spring metal coil closely wound helically in one direction; a reinforcing inner spring metal coil closely wound helically in the opposite direction and fitting snugly within said outer coil; means fixedly connecting said two coils together at one end; two relatively rotatable members attached to the other end portions of said coils; torque applying means connected with said two relatively rotatable members; and reversible releasable ratchet means interconnecting said two relatively rotatable members.

4. A pipe bending tool for insertion into a pipe which is to be bent comprising a pipe engaging outer spring metal coil closely wound helically in one direction; a reinforcing inner spring metal coil closely wound helically in the opposite direction and fitting snugly within said outer coil; means fixedly connecting said two coils together at one end; two relatively rotatable members attached to the other end portions of said coils; a manually operable crank connected with each of said relatively rotatable members, whereby torque may be exerted thereon; and reversible releasable ratchet means interconnecting said two relatively rotatable members.

References Cited in the file of this patent

UNITED STATES PATENTS

| | | |
|---|---|---|
| 166,294 | Orum | Aug. 3, 1875 |
| 230,125 | Gear | July 20, 1880 |
| 406,992 | Burgoin | July 16, 1889 |
| 538,555 | Smith | Apr. 30, 1895 |
| 1,923,148 | Hotchner | Aug. 22, 1933 |